(12) United States Patent
Etchepare et al.

(10) Patent No.: US 12,275,669 B2
(45) Date of Patent: Apr. 15, 2025

(54) METHOD FOR TREATING GLASS CONTAINERS COMPRISING AN OPTICAL CHECK OF A QUANTITY OF TREATMENT SUBSTANCE DISPENSED, AND RELATED TREATMENT INSTALLATION

(71) Applicant: SGD S.A., Paris la Défense (FR)

(72) Inventors: Pierre-Luc Etchepare, Rouen (FR); Christophe Depoilly, Aigneville (FR); Jingwei Zhang, Massy (FR)

(73) Assignee: SGD S.A., Paris la Defense (FR)

( * ) Notice: Subject to any disclaimer, the term of this patent is extended or adjusted under 35 U.S.C. 154(b) by 438 days.

(21) Appl. No.: 17/791,481

(22) PCT Filed: Nov. 30, 2020

(86) PCT No.: PCT/FR2020/052222
§ 371 (c)(1),
(2) Date: Jul. 7, 2022

(87) PCT Pub. No.: WO2021/140281
PCT Pub. Date: Jul. 15, 2021

(65) Prior Publication Data
US 2023/0081839 A1    Mar. 16, 2023

(30) Foreign Application Priority Data

Jan. 8, 2020 (FR) ..................... 2000127

(51) Int. Cl.
*C03C 21/00* (2006.01)
*G06T 7/11* (2017.01)
(Continued)

(52) U.S. Cl.
CPC .......... *C03C 21/007* (2013.01); *C03C 21/002* (2013.01); *G06T 7/11* (2017.01); *G06T 7/38* (2017.01); *G06T 7/70* (2017.01)

(58) Field of Classification Search
USPC ........................................... 427/181
See application file for complete search history.

(56) References Cited

U.S. PATENT DOCUMENTS 3,281,225 A * 10/1966 Hazdra ................. C03C 21/007
65/30.13
3,348,934 A * 10/1967 Hinson ................... C03C 15/00
65/32.4

(Continued)

FOREIGN PATENT DOCUMENTS

CN    1087326 A    6/1994
EP    0821079 A1    1/1998
(Continued)

*Primary Examiner* — Paul R Durand
*Assistant Examiner* — Michael J. Melaragno
(74) *Attorney, Agent, or Firm* — Nath, Goldberg & Meyer; Joshua B. Goldberg (57) ABSTRACT

The invention relates to a method for treating the wall of a glass container (1), which wall delimits a cavity (4) and an opening providing access to said cavity (4), the method comprising: the dispensing of a treatment substance into the cavity, using a dispensing means (12) of which a dispensing orifice (13) is positioned some distance from the opening of the container (1) and outside the latter, the container (1) being in motion relative to the dispensing means (12), and the capturing, by an image-capturing device (16), during the dispensing, of at least one image of a spatial region including the opening of the container (1) and determining, by analysing said image, whether or not a predetermined quantity of substance was introduced into the cavity (4) of the container (1). Method and installation for treating glass containers.

22 Claims, 3 Drawing Sheets

(51) Int. Cl.
*G06T 7/38* (2017.01)
*G06T 7/70* (2017.01)

(56) References Cited

U.S. PATENT DOCUMENTS

| | | | | |
|---|---|---|---|---|
| 3,451,796 | A * | 6/1969 | Mochel | C03C 21/007 |
| | | | | 65/30.14 |
| 4,493,722 | A * | 1/1985 | Ono | C03B 9/1932 |
| | | | | 65/72 |
| 5,314,534 | A * | 5/1994 | Giersberg | C03C 17/253 |
| | | | | 106/287.19 |
| 5,510,144 | A * | 4/1996 | Cordie | C03C 23/00 |
| | | | | 65/30.13 |
| 11,912,611 | B2 * | 2/2024 | Depoilly | C03C 17/005 |
| 2009/0000336 | A1 * | 1/2009 | Rosler | C03C 17/004 |
| | | | | 65/158 |
| 2009/0287439 | A1 * | 11/2009 | Holden | G01B 11/2408 |
| | | | | 702/81 |
| 2011/0244153 | A1 * | 10/2011 | Shiozawa | C03C 17/25 |
| | | | | 428/34.4 |
| 2012/0047926 | A1 * | 3/2012 | Sjong | F25B 49/005 |
| | | | | 422/83 |
| 2014/0151370 | A1 * | 6/2014 | Chang | B32B 17/06 |
| | | | | 220/62.15 |
| 2015/0108078 | A1 * | 4/2015 | Hoekman | B05D 7/227 |
| | | | | 427/236 |
| 2018/0067091 | A1 * | 3/2018 | Burkhalter | G01N 33/386 |
| 2018/0116907 | A1 * | 5/2018 | Fadeev | A61J 1/1468 |
| 2019/0145904 | A1 * | 5/2019 | Lopez | G01N 21/90 |
| | | | | 356/239.4 |
| 2019/0161399 | A1 * | 5/2019 | Fadeev | B65D 23/0821 |
| 2020/0141878 | A1 * | 5/2020 | Lisman | C03B 23/057 |
| 2021/0114921 | A1 * | 4/2021 | Depoilly | C03C 21/006 |
| 2022/0242784 | A1 * | 8/2022 | Etchepare | C03C 23/008 |
| 2022/0269169 | A1 * | 8/2022 | Clark | G03F 7/16 |
| 2023/0016184 | A1 * | 1/2023 | Etchepare | C03C 23/00 |
| 2023/0081839 | A1 * | 3/2023 | Etchepare | C03C 21/007 |
| | | | | 65/29.12 |

FOREIGN PATENT DOCUMENTS

| | | | | |
|---|---|---|---|---|
| FR | 3078329 A1 * | 8/2019 | | C03C 17/004 |
| GB | 531145 | 12/1940 | | |
| JP | 2018-144839 A | 9/2018 | | |
| WO | 2007/062694 A1 | 6/2007 | | |
| WO | WO-2019158563 A1 * | 8/2019 | | B67D 1/06 |
| WO | 2019/166719 A1 | 9/2019 | | |
| WO | WO-2021111066 A1 * | 6/2021 | | B65B 1/00 |

* cited by examiner

METHOD FOR TREATING GLASS CONTAINERS COMPRISING AN OPTICAL CHECK OF A QUANTITY OF TREATMENT SUBSTANCE DISPENSED, AND RELATED TREATMENT INSTALLATION

This is a National Phase Application filed under 35 U.S.C. 371 as a national stage of PCT/FR2020/052222, filed Nov. 30, 2020, an application claiming the benefit of French Application No. FR2000127, filed Jan. 8, 2020, the content of each of which is hereby incorporated by reference in its entirety.

TECHNICAL FIELD

The present invention relates to the general technical field of methods and installations for the treatment of glass containers.

PRIOR ART

The invention more particularly relates to a method for treating the inner face of the wall of a glass container, which wall delimits an accommodation cavity for a product and an opening providing access to said accommodation cavity, said method comprising an operation of dispensing a treatment substance into said cavity using a dispensing means, an orifice of which for dispensing said treatment substance is located at a distance from the opening of the container and outside the latter, said container being in motion relative to said dispensing means.

The invention also relates to an installation for treating the inner face of the wall of a glass container, which wall delimits an accommodation cavity for a product and an opening providing access to said accommodation cavity, said installation comprising a dispensing means for dispensing a treatment substance into said cavity, said dispensing means being provided with an orifice for dispensing said treatment substance and being designed so that said dispensing orifice is located at a distance from the opening of the container and outside the latter and to dispense said treatment substance while said container is in motion relative to said dispensing means.

In the field of pharmaceutical glass primary packaging, the purpose is to propose containers, in particular of the vial type, that have an excellent chemical compatibility with the product or preparation they are intended to contain. Indeed, the aim is to prevent any harmful interaction between a species from the glass forming the container and the product contained by the latter. In this respect, it is known to subject glass containers, before their use, to a dealkalization treatment that consists in extracting, over a depth of several dozens of nanometres, the alkaline ions—and in particular the sodium ions—present in the vicinity of the surface of the inner face of the glass wall of the container, and evacuating them, in order to avoid as much as possible the elution of the alkaline ions over time into the product contained by the container. Such a treatment is generally carried out by introducing into a glass container to be treated a reactive substance that is capable, under the action of heat, to generate an acid gas likely to chemically react with the alkaline ions present in the glass of the container. The chemical (or hydrolytic) resistance level of the container is thus improved.

Dealkalization treatment methods are thus known, which consist in introducing into a hot glass container ammonium sulphate $(NH_4)_2SO_4$ in solid form, for example in the form of a crystalline powder or tablets, through a dispenser positioned above the containers. Under the effect of heat, the ammonium sulphate sublimates and forms a gas that reacts with the sodium contained in the glass in the immediate vicinity of the surface of the container wall inner face. The sodium so extracted from the glass is then deposited at the surface of said container inner face in the form of a residual powder compound of sodium sulphate $Na_2SO_4$, which can then be removed by washing.

If the known treatment methods and installations are generally satisfactory, there is still room for improvement. In particular, it may occur that the quantity of treatment substance really dispensed into the glass containers to be treated is insufficient to ensure a suitable treatment and to reach the required chemical (or hydrolytic) resistance level. Such a phenomenon may be linked, for example, to a bad positioning of the treatment substance dispenser with respect to the containers to be treated, to a wrong setting of the dispenser, or also to a deviation over time in the setting of the latter. However, it is imperative, for health safety reasons, to ensure that the treatment method is perfectly reliable. It is therefore crucial to ensure that the glass containers have effectively received at least a sufficient and necessary quantity of treatment substance to allow reaching the hydrolytic resistance level required for the container, in compliance with the applicable Pharmacopoeia. Moreover, it is important to make sure that the mechanical properties of the glass containers were not degraded as a result of the treatment carried out.

DISCLOSURE OF THE INVENTION

The objects assigned to the present invention therefore aim to propose a new treatment method and a new treatment installation that make it possible to ensure in a simple and effective manner that a glass container the inner wall surface of which is to be treated receives a sufficient and necessary quantity of treatment substance to ensure a sufficient treatment of said glass container.

Another object of the invention aims to propose a new treatment method and a new treatment installation that make it possible to obtain a pharmaceutical glass container that is particularly safe in terms of health.

Another object of the invention aims to propose a new treatment method and a new treatment installation that make it possible to ensure that the glass container has been suitably treated without prejudice to its mechanical strength.

Another object of the invention aims to propose a new treatment method and a new treatment installation that make it possible to ensure in a simple and effective manner the quality of the treatment carried out at very high treatment rates, and that for containers of any shape and size, including containers with a very small ring opening.

Another object of the invention aims to propose a new treatment method and a new treatment installation that make it possible to ensure an excellent repeatability of the treatment carried out.

Another object of the invention aims to propose a new treatment method and a new treatment installation, the implementation of which is particularly simple and economical, in particular in a context of industrial manufacture of glass containers.

The objects assigned to the invention are achieved by means of a method for treating the inner face of the wall of a glass container, which wall delimits an accommodation cavity for a product and an opening providing access to said accommodation cavity, said method comprising an operation of dispensing a treatment substance into said cavity, using a dispensing means, an orifice of which for dispensing said treatment substance is located at a distance from the opening of the container and outside the latter, said container being in motion relative to said dispensing means, and a check operation comprising capturing, by an image-capture device, during said dispensing operation, at least one image of a spatial area including the opening of the container, and determining, by analysis of the so-captured image, whether or not at least a predetermined quantity of said treatment substance has been introduced into the cavity of the container through the opening of the latter.

The objects assigned to the invention are also achieved by means of an installation for treating the inner face of the wall of a glass container, which wall delimits an accommodation cavity for a product and an opening providing access to said accommodation cavity, said installation comprising:

a dispensing means for dispensing a treatment substance into said cavity, said dispensing means being provided with an orifice for dispensing said treatment substance and being designed so that said dispensing orifice is located at a distance from the opening of the container and outside the latter and to dispense said treatment substance while said container is in motion relative to said dispensing means, and a check means comprising an image-capture device for capturing, when the dispensing means dispenses said treatment substance, at least one image of a spatial area including the opening of the container, and an image-analysis system for determining, by analysing the captured image, whether or not at least a predetermined quantity of said treatment substance has been introduced into the cavity of the container through the opening of the latter.

BRIEF DESCRIPTION OF THE DRAWINGS

Other features and advantages of the invention will appear in more detail upon reading of the following description, with reference to the appended drawings, given by way of purely illustrative and non-limiting examples, in which.

According to a first aspect, the invention relates to a method for treating a glass container 1, such as a vial. The invention further relates, according to a second independent aspect, to an installation 2 for treating such a glass container 1. More precisely, as illustrated as an example in FIG. 1, the container 1 the treatment method and installation 2 according to the invention relate to comprises a wall 3 delimiting an accommodation cavity 4 for a product (or a substance) and an opening 5 providing access to said accommodation cavity 4. The glass wall 3 has an inner face 6, located facing said accommodation cavity 4 and preferentially intended to come into direct contact with said product, and an opposite outer face 7. Herein, the treatment method and installation 2 according to the invention are method and installation 2 for treating the inner face 6 of the wall 3 of such a glass container 1. The treatment method and installation 2 according to the invention are preferably industrial method and installation, advantageously automated, intended to be integrated to industrial glass container production line and method. In this respect, said method and said installation 2 are preferentially designed to allow the treatment of a large number of glass containers 1 in a substantially uninterrupted manner.

The treatment method according to the invention is preferentially intended to be implemented using a treatment installation 2 according to the invention. Reciprocally, the treatment installation 2 is preferentially intended to implement the treatment method according to the invention. Said treatment method and installation will now be described in parallel, it being understood that the features, definitions, effects and advantages described in relation with the treatment method advantageously apply mutatis mutandis to the treatment installation according to the invention, and reciprocally. This being said, the treatment method according to the invention is not necessarily limited to an implementation using the treatment installation that will be described hereinafter, and reciprocally, the treatment installation according to the invention is not necessarily limited to the sole implementation of the treatment method that will be described hereinafter.

In the sense of the invention, the word "glass" refers to a mineral glass. Preferentially made of moulded or drawn glass, and formed of a single, monolithic piece of glass, the container 1 the invention relates to may have any shape adapted to its function, such as for example the shape of a vial or a bottle. As illustrated by way of example in FIG. 1, the wall 3 of the container 1 is advantageously formed by a glass bottom 8, a glass lateral wall 9 that rises from the periphery of the bottom 8, and a neck 10 provided with a ring 11 that delimits the opening 5 of the container 1, to allow the accommodation cavity 4 to be put in communication with the outside. Advantageously, said opening 5 is designed so as to be able to be closed by a removable or pierceable plug or membrane seal.

Preferably, the product intended to be received into the cavity 4 of the container 1 is advantageously fluid, i.e. likely to flow like, for example, a liquid, pasty (such as a liquid with a high degree of viscosity) or powder substance. Preferably, it is a pharmaceutical product or a substance, such as for example a medication, potentially intended to be administered by parenteral route (general or locoregional) or to be ingested or absorbed by a patient, or also a diagnostic substance, as for example a chemical or biological reagent. By extension, the container 1 can be designed to contain a biological substance (or body fluid), such as for example blood, a blood product or by-product, urine, etc. Even if the application to the pharmaceutical and diagnostic fields is preferred, the invention is however not limited to the treatment of pharmaceutical and diagnostic containers 1 and may in particular also relate to a container designed to contain a liquid, pasty or powder substance for industrial (storage of chemical products, etc.), scientific (laboratory glassware), veterinary, food or also cosmetic use.

In accordance with the invention, the treatment method comprises an operation of dispensing a treatment substance into the accommodation cavity 4 of the container 1, i.e. an advantageously reactive substance, intended for obtaining the searched treatment effect. It is preferably a treatment substance that is solid, and more preferably powdery or granular, or liquid (with higher or lower viscosity). The dispensing operation is carried out using a dispensing means 12 that comprises a dispensing orifice 13 through which said treatment substance is dispensed. During the dispensing operation, the dispensing orifice 13 of the dispensing means 12 is located at a distance from the opening 5 of the container 1 and outside the latter, and the container 1 to be treated is in motion relative to the dispensing means 12. The dispensing means 12 remains preferentially stationary in the terrestrial reference system. Preferably, the container 1 moves with respect to the dispensing means 12 along a substantially rectilinear path (indicated by an arrow T in FIGS. 1 to 3), which is advantageously substantially orthogonal to an average direction of dispensing of the treatment substance by the dispensing means 12.

Figure 2:
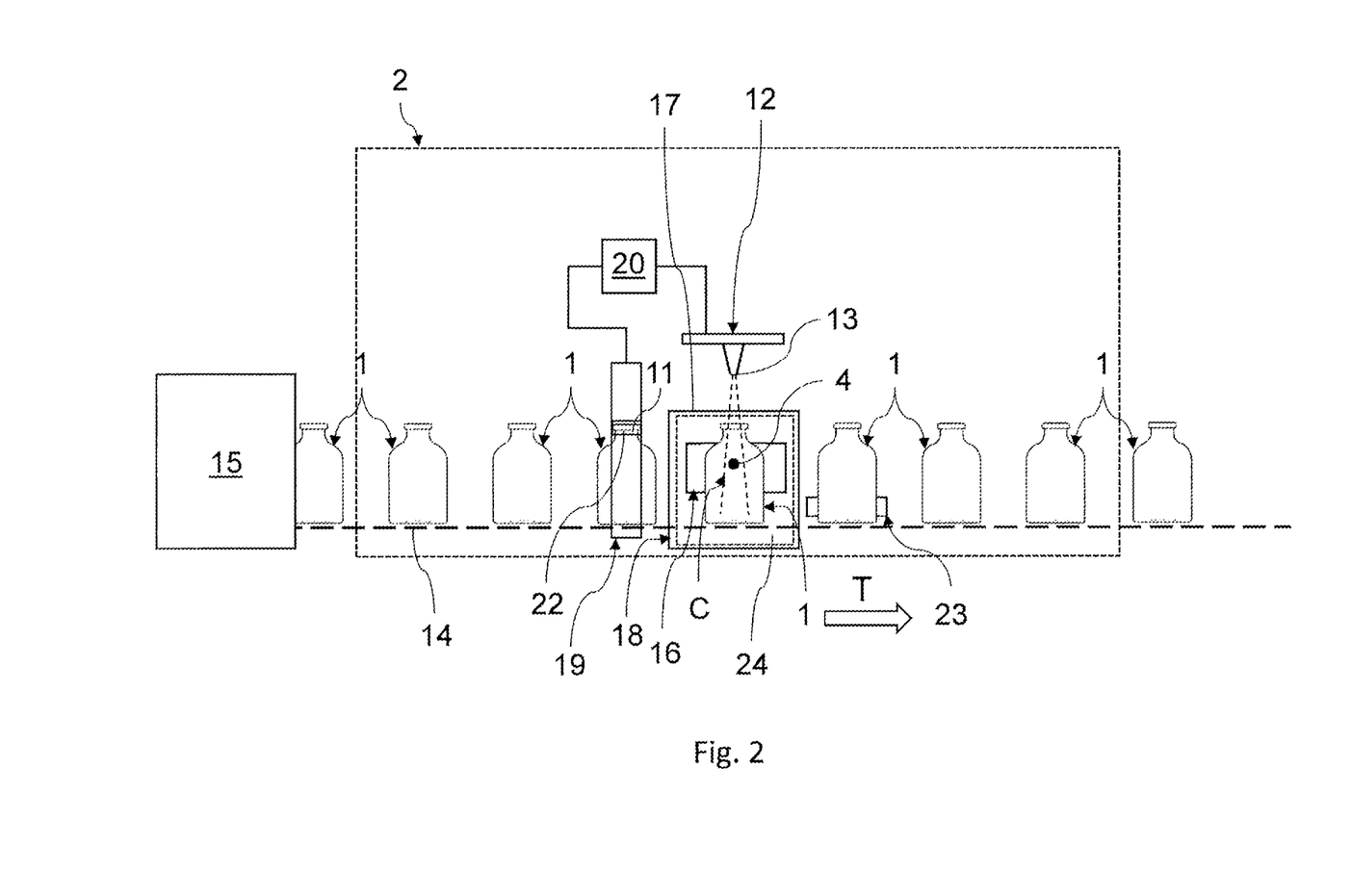
FIG. 2 schematically illustrates, in a side view, a preferential embodiment of a treatment installation according to the invention.
Figure 3:
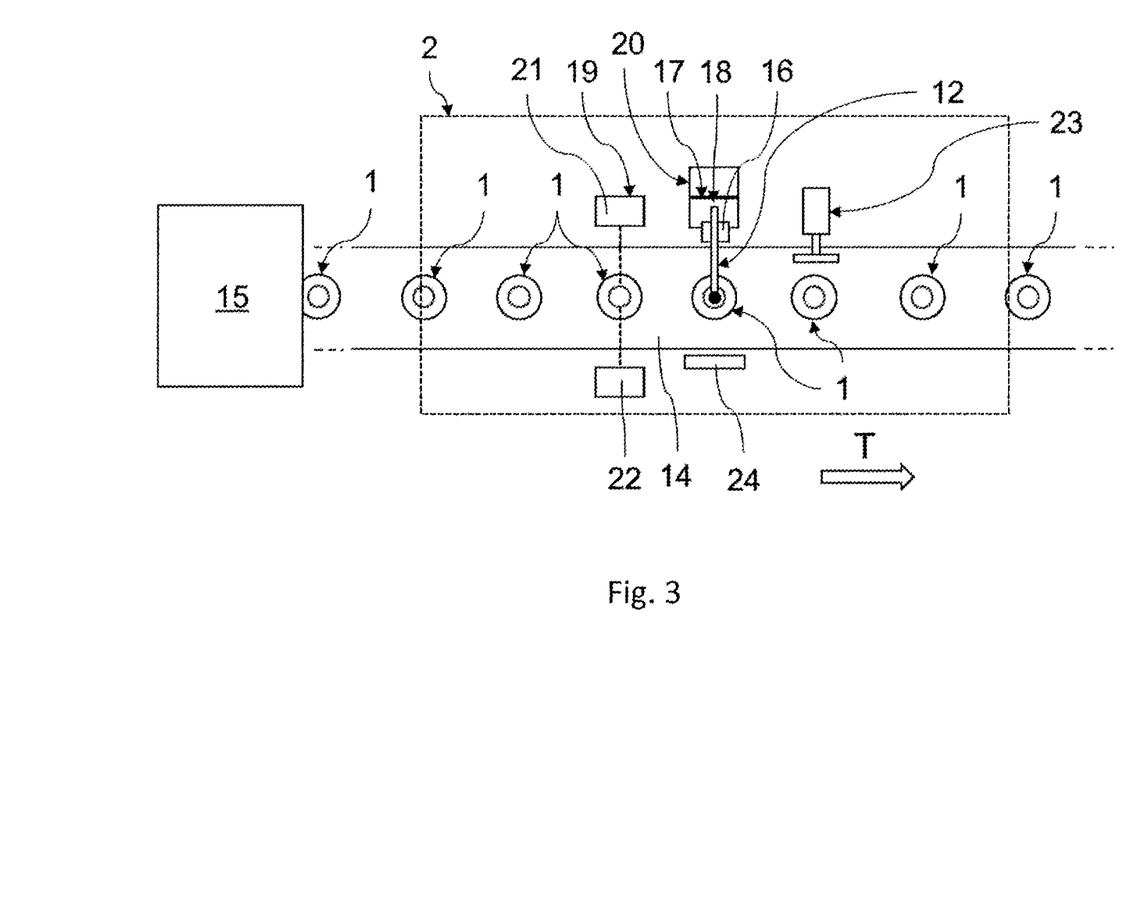
FIG. 3 schematically illustrates, in a top view, the treatment installation of FIG. 2.

The treatment installation 2 according to the invention, a preferential embodiment of which is illustrated in FIGS. 2 and 3, comprises a dispensing means 12 that is advantageously intended for the implementation of the above-mentioned dispensing operation. Said dispensing means 12 is designed to dispense a treatment substance, as described hereinabove, into the cavity 4 of the container 1. Provided with an orifice 13 for dispensing said treatment substance, the dispensing means 12 is designed in such a way that said dispensing orifice 13 is located at a distance from the opening 5 of the container 1 and outside the latter, at least when the dispensing means 12 is in operation and dispenses said treatment substance. Said dispensing means 12 is moreover designed to dispense said treatment substance while the container 1 to be treated is in motion relative to said dispensing means 12.

Figure 1:
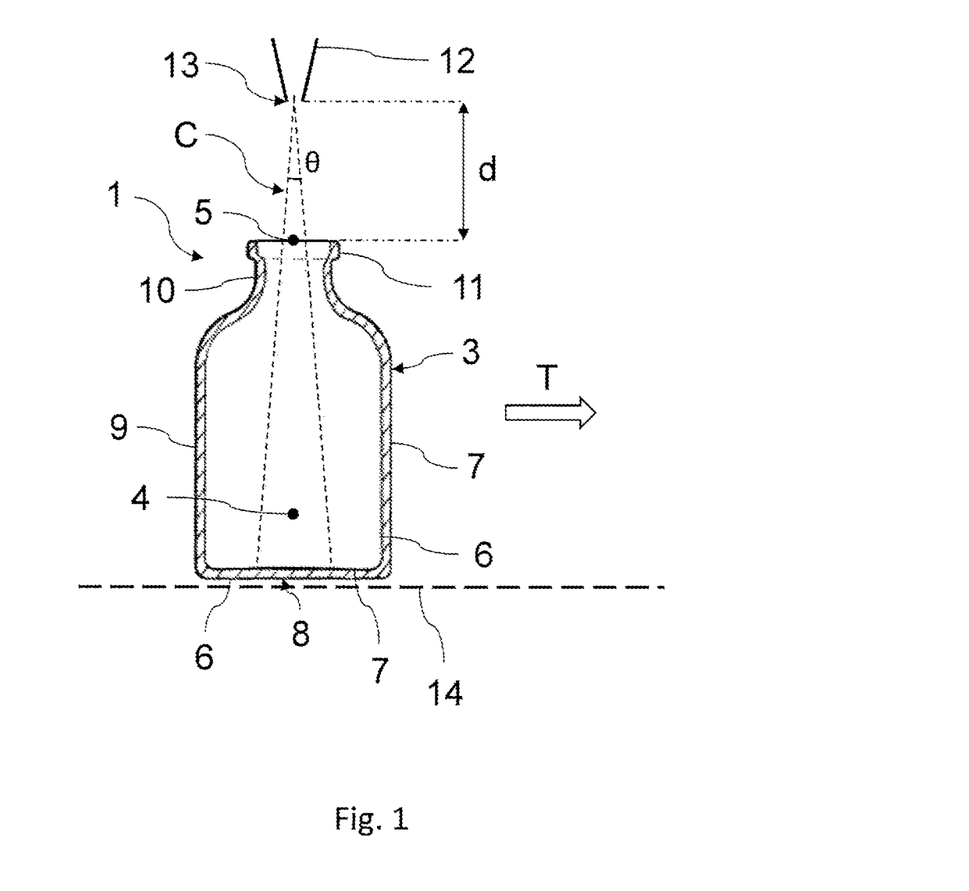
FIG. 1 schematically illustrates an example of glass container of the vial type subjected to an operation of introducing a treatment substance into its cavity, in accordance with the treatment method according to the invention.

The dispensing means 12 of the method and installation 2 is preferentially designed in such a way that, when the opening 5 of the container 1 to be treated is positioned facing the dispensing orifice 13 of the dispensing means 12, the treatment substance can be dispensed through said dispensing orifice 13 as a dispensing cone C (illustrated in dotted line in FIG. 1), a cross-section of which, included in a plane comprising the opening 5 of the container 1, has a lower (and preferably far lower) size than said opening 5 of the container 1 in said plane (FIG. 1). Such a configuration is indeed particularly favourable to an accurate dispensing of the treatment substance towards the cavity 4 of the container 1 to be treated. It will be noted that "dispensing cone" is not to be considered herein according to a strict mathematical definition of the term "cone", but preferentially means a dummy envelope (whether conical, frustoconical, or even ideally substantially cylindrical) inside which is contained substantially all the quantity of treatment substance dispensed by the dispensing means 12.

Notwithstanding the above, the dispensing means 12 may be designed to dispense said treatment substance as a spray or a trickle of little grains or crystals, as a single drop or droplet, or also as a spray or trickle of a plurality of drops or droplets.

According to a preferential embodiment, illustrated in the Figures, the putting in motion of the glass container 1 relative to said dispensing means 12 is ensured by a conveyor 14, on which the glass container 1 is arranged, with its bottom 8 resting on the conveyor 14 and its opening 5 directed upward. The dispensing means 12 is preferentially positioned above and facing the conveyor 14 in such a way that the dispensing orifice 13 of the dispensing means 12 can be positioned above and facing the opening 5 of the container 1 to be treated when the latter is moved by the conveyor 14. In this case, the treatment substance is typically dispensed under the sole effect of gravity, the treatment substance thus dropping freely under its own weight under the effect of gravity from the dispensing orifice 13 of the dispensing device 12 into the cavity 4 of the container 1, or under pressure. However, other spatial configurations may be contemplated. For example, the container 1 could be lying on the conveyor 14 and the dispensing means 12 could then be located laterally with respect to the conveyor 14. During the dispensing operation, the dispensing orifice 13 of the dispensing means 12 and the opening 5 of the container 1 are preferentially spaced apart by a distance d between 1 and 20 cm.

The treatment method and installation 2 according to the invention may advantageously be implemented to carry out different types of treatment (doping, chemical hardening, etc.) of the inner face 6 of the wall 3 of a glass container 1, according in particular to the nature of the treatment substance used. According to a preferential embodiment, said method and installation 2 are however more specifically respectively method and installation 2 for dealkalization treatment of the glass in the vicinity of the surface of the inner face 6 of the wall 3 of the glass container 1. It is understood that, in this case, the glass of said concerned container 1 is then a glass containing at least one alkaline species, such as sodium in particular. It may then be a container made of soda-lime-silica glass ("Type III" glass), or also a container made of borosilicate glass ("Type I" glass), insofar as such a borosilicate glass does contain at least one alkaline species, although in lower quantity than in the case of a soda-lime-silica glass. In a manner known per se, such a dealkalization method aims to extract, typically over a depth of several dozens of nanometres, the alkaline ions (and in particular the sodium ions) present in the glass in the vicinity of the surface of the inner face 6 of the wall 3 of the container 1. Once the container 1 treated, the glass in the vicinity of the surface of the inner face 6 of the wall 3 of the container 1 is thus, preferably significantly, depleted in alkaline ions.

In the case of such a dealkalization treatment, the treatment substance (or dealkalization substance) is preferentially designed to react under heat to cause a dealkalization of the glass in the vicinity of the surface of the inner face 6 of the glass wall 3. As will be detailed hereinafter, said inner face 6 is then brought, before or after the treatment substance dispensing into the cavity 4 of the container 1, to a treatment temperature that is sufficient to cause the reaction of the treatment substance, the latter being therefore designed to react under the heat of the inner face 6 of the wall 3 of the container 1 to cause a dealkalization of the glass. It may be a treatment substance that, as such, is capable of coming itself into direct contact with the hot inner face 6 of the wall 3 of the container 1 to react, under heat, with one or several alkaline species present in the glass forming the wall 3 of the container 1 or also a treatment substance capable of decomposing under the heat inside the cavity 4 of the container 1, due to the temperature of the inner face 6 of the wall 3, to produce one or several new chemical species or substances, which are capable of coming into contact with the surface of the inner face 6 of the wall 3 of the container 1 and reacting with one or several alkaline species present in the glass forming said wall 3 in order to obtain the desired effect of dealkalization. Preferably, said treatment substance comprises a sulphur compound, and more preferably a compound containing sulphur combined with oxygen. Even more preferentially, said sulphur compound is an ammonium sulphate. Indeed, such a treatment substance based on ammonium sulphate is relatively easy and inexpensive to implement, and allows a particularly efficient dealkalization treatment of the glass container 1. This being said, other dealkalization treatment substances liable to react under heat (such as, for example, ammonium chloride or aluminium ammonium sulphate) could obviously be used.

According to a preferential alternative, the operation of dispensing the dealkalization treatment substance into the accommodation cavity 4 of the glass container 1 is carried out while the inner face 6 of the wall 3 of said glass container 1 is at a temperature (or treatment temperature) of advantageously at least 350° C., preferably between 350° and 850° C., preferably between 350° C. and 800° C., more preferably between 350° C. and 700° C. Indeed, most known dealkalization substances, and in particular ammonium sulphate, may be efficiently implemented at such a treatment temperature. In this respect, the treatment method may advantageously comprise, upstream form said dispensing operation, a operation of supplying a glass container 1 such as described hereinabove, (at least) the inner face 6 of the wall 3 of which is at a temperature of advantageously at least 350° C., preferably between 350° and 850° C., preferably between 350° C. and 800° C., more preferably between 350° C. and 700° C. Such an operation of supplying the container 1 may include a step of heating, using any known suited heating means, a pre-existing glass container 1 as described hereinabove, and the inner face 6 of the wall 3 of which is initially at a temperature close (if not equal) to the ambient temperature, to heat it in such a way that the temperature of at least the inner face 6 of its wall 3 reaches a value of advantageously at least 350° C., preferably between 350° and 850° C., preferably between 350° C. and 800° C., more preferably between 350° C. and 700° C. As an alternative, and more advantageously, the operation of supplying the container 1 may comprise a step of collecting a glass container 1 as described hereinabove, at the exit of a machine 15 for hot forming a glass container from a glass preform, while said container 1 is still hot enough so that (at least) the inner face 6 of the wall 3 of said container 1 is at a temperature of advantageously at least 350° C., preferably between 350° and 850° C., preferably between 350° C. and 800° C., more preferably between 350° C. and 700° C. According to such a preferential alternative, the method according to the invention thus does not require the implementation of a particular heating step, the inner face 6 of the wall 3 of the container 1 being brought to a temperature of advantageously at least 350° C., preferably between 350° C. and 850° C., preferably between 350° C. and 800° C., more preferably between 350° C. and 700° C., as a direct consequence of a previous step of forming said container 1. Such a forming step can be carried out using any known machine 15 for forming glass containers 1, such as for example an IS machine in the case of a container 1 made of moulded glass. The implementation of the method according to the invention is therefore simplified, in particular when the latter is implemented in an industrial context of manufacture of glass containers 1.

According to another alternative, the operation of dispensing the treatment substance into the accommodation cavity 4 of the glass container 1 may be carried out while the inner face 6 of the wall 3 of said glass container 1 is at ambient temperature. In this case, the treatment method may comprise, after said dispensing step, a step of heating the container 1 into which the treatment substance has been dispensed, to bring the inner face 6 of the wall 3 of said container 1 to a temperature of advantageously at least 350° C., preferably between 350° C. and 850° C., preferably between 350° C. and 800° C., more preferably between 350° C. and 700° C. Such a heating step may for example be carried out in an annealing arch within which the container 1 is placed at the end of said treatment substance dispensing operation.

Reciprocally, the treatment installation 2 is then preferentially designed to dispense, introduce, the treatment substance into the accommodation cavity 4 of the glass container 1 while the inner face 6 of the wall 3 of said glass container 1 is at a temperature (or treatment temperature) of advantageously at least 350° C., preferably between 350° and 850° C., preferably between 350° C. and 800° C., more preferably between 350° C. and 700° C., in such a way as to allow the reaction of the treatment substance under the heat of the inner face 6 of the wall 3 of the container 1 to therefore cause a dealkalization of the glass. In this respect, the installation 2 can advantageously comprise a means for supplying a glass container 1 as described hereinabove, at least the inner face 6 of the wall 3 of which is at a temperature of advantageously at least 350° C., preferably between 350° and 850° C., preferably between 350° C. and 800° C., more preferably between 350° C. and 700° C. According to an alternative, this supply means could comprise a heating means, of any known suitable type (for example, of the arch or oven type), designed to heat a pre-existing glass container 1 as described hereinabove and the inner face 6 of the wall 3 of which is initially at a temperature close (if not equal) to the ambient temperature, in such a way that the temperature of at least the inner face 6 of the wall 3 of the container 1 reaches a value of advantageously at least 350° C., preferably between 350° C. and 850° C., preferably between 350° C. and 800° C., more preferably between 350° C. and 700° C. According to another, more preferential alternative, illustrated in FIGS. 2 and 3, the means for supplying the container 1 comprises a system for collecting a glass container 1 as described hereinabove at the exit of a machine 15 for hot forming a glass container 1 from a glass preform, while said container 1 is still hot enough so that (at least) the inner face 6 of the wall 3 of said container 1 is at a temperature of advantageously at least 350° C., preferably between 350° C. and 850° C., preferably between 350° C. and 800° C., more preferably between 350° C. and 700° C. According to this preferential alternative, the installation 2 therefore advantageously comprises no specific heating means for heating the container 1, the inner face 6 of the wall 3 of the container 1 being brought to a desired treatment temperature as a direct consequence of a previous operation of forming said container 1 by said forming machine 15. As mentioned hereinabove in relation with the treatment method, this machine 15 for forming glass containers 1 may be of any known type, such as for example an IS machine in the case of a container 1 made of moulded glass. The collecting system may, for example, comprise an arm, advantageously robotic, and/or a conveyor (for example, of the belt or roll type), designed, arranged and sized to collect a glass container 1 at the exit of a forming machine 15, close enough to the latter so that (at least) the inner face 6 of the wall 3 of the container 1 is still at a temperature of advantageously at least 350° C., preferably between 350° C. and 850° C., preferably between 350° C. and 800° C., more preferably between 350° C. and 700° C. Advantageously, the conveyor of the collecting system can be merged with the above-mentioned conveyor 14, on which the container 1 is brought to the dispensing means 12 for the treatment substance to be dispensed. As an alternative, the installation 2 as such may not comprise such means for supplying a container 1 (at least) the inner face 6 of the wall 3 of which is at a temperature of advantageously at least 350° C., preferably between 350° C. and 850° C., preferably between 350° C. and 800° C., more preferably between 350° C. and 700° C., except for the above-mentioned conveyor 14, but it is nonetheless designed (particularly in terms of choice of materials, etc.) to be able to operate satisfactorily in the presence of a container 1 the inner face 6 of which is brought to such a temperature.

As an alternative, but less preferentially, the installation 2 as such may not be specifically designed to introduce the treatment substance into the accommodation cavity 4 of the glass container 1 while the inner face 6 of the wall 3 of the latter is at a temperature of advantageously at least 350° C., preferably between 350° and 850° C., preferably between 350° C. and 800° C., more preferably between 350° C. and 700° C., but on the contrary while said inner face 6 is at ambient temperature. In this case, the installation 2 could then comprise (or at least being designed to be placed upstream from) a means for heating the container 1, such as an annealing arch, positioned downstream from the dispensing means 12, to bring the inner face 6 of the wall 3 of the container 1 to a temperature of advantageously at least 350° C., preferably between 350° C. and 850° C., preferably between 350° C. and 800° C., more preferably between 350° C. and 700° C., once the treatment substance dispensed into the container 1.

The treatment method according to the invention also comprises an operation of checking that the treatment substance dispensing operation is running correctly. It is advantageously a real-time check operation, which takes place at least in part simultaneously with said dispensing operation, and not a check operation carried out a posteriori, once the container 1 treated. According to the invention, said check operation comprises capturing, by an image-capture device 16, during said dispensing operation, at least one image of a spatial area including the opening 5 of the container 1, and determining, by analysis of the so-captured image, whether or not at least a predetermined quantity of said treatment substance has been introduced into the cavity 4 of the container 1 through the opening 5 of the latter during the dispensing operation. Advantageously, at least the dispensing orifice 13 of the dispensing means 12 and the opening 5 of the container 1 are then included in said spatial area, and hence in the so-captured image(s). Therefore, if the dispensing means 12 can potentially be designed to dispense a quantity of treatment substance that is greater than the quantity strictly necessary to carry out the desired treatment of the container 1, the capture and analysis of image(s) by the image-capture device 16 during the dispensing operation aims to ensure that at least a predetermined quantity—which will have been previously defined as being the minimum quantity required to obtain a desired treatment level—has actually been introduced into the cavity 4 of the container 1 during the dispensing operation. Obviously, the definition of the predetermined quantity of treatment substance will depend on the nature of the treatment to be made, the size of the container 1, the expected level of treatment, etc.

Advantageously, and in particular in the case where the quantity of treatment substance dispensed during the dispensing operation is higher than said predetermined quantity of treatment substance, the check operation comprises determining, by analysing said at least one so-captured image, whether or not substantially all the quantity of treatment substance dispensed by the dispensing means 12 during said dispensing operation has been introduced into the cavity 4 of the container 1, through the opening 5 of the latter. The check operation therefore aims not only to ensure that the predetermined quantity of treatment substance has actually been introduced into the container 1 to be treated, but also to ensure that, during the dispensing operation, no treatment substance has been dispensed outside the cavity 4 of the container 1, whether it is next to the container 1, on the ring 11 and/or on the outer face 7 of the wall 3 of said container 1. Indeed, if it is not necessarily inconvenient that the container 1 receives more treatment substance than it would be required to obtain a satisfying level of treatment, the dispersion of treatment substance outside the container 1 can nevertheless have substantial economic (cost of the treatment substance itself, clogging of the installations requiring costly maintenance, etc.) and/or sanitary consequences. Moreover, the deposition of treatment substance on the ring 11 or on the surface of the outer face 7 of the wall 3 of the container 1 lead to treat in a non desired and potentially problematic manner the glass at said ring 11 and/or outer face 7, in the sense that it may result in the generation of aesthetic defects and/or a hindrance to the smooth running of a possible subsequent operation of optical inspection aiming to search for glass defects the container 1 could show. Such a deposition may also lead to a mechanical weakening of the container 1, and in particular of the ring 11 of the latter, by reaction with the treatment substance. Such a risk of weakening is observed in particular in the case, contemplated hereinabove, in which the treatment substance is advantageously provided to allow a hot dealkalization treatment of the glass.

Symmetrically, the treatment installation 2 according to the invention comprises a check means 17, which is advantageously designed and configured to allow the implementation of the check operation described hereinabove. Said check means 17 comprises an image-capture device 16 for capturing, when the dispensing means 12 operates and dispenses said treatment substance, at least one image of a spatial area including the opening 5 of the container 1. Advantageously, said image-capture device 16 is configured in such a way that the dispensing orifice 13 of the dispensing means 12 and the opening 5 of the container 1 are then located inside said spatial area, and hence in the so-captured image(s). The check means 17 also comprises an image-analysis system 18 that it specifically designed, configured, set, to determine, by analysing said at least one captured image, whether or not at least a predetermined quantity (as defined hereinabove) of said treatment substance has been introduced into the cavity 4 of the container 1 through the opening 5 of the latter. Advantageously, and in particular in the case where the dispensing means 12 of the treatment installation 2 is designed, configured, set, to dispense a quantity of treatment substance that is higher than said predetermined quantity, said image-analysis system 18 is designed, configured, set, to determine, by analysing said at least one captured image, whether or not substantially all the quantity of treatment substance dispensed by the dispensing means 12 has been introduced into the cavity 4 of the container 1, through the opening 5 of the latter.

Therefore, thanks to the implementation of such an optical check of the correct dispensing of the treatment substance into the glass container 1, the treatment method and installation 2 make it possible to ensure in a simple and efficient manner that said container 1, the inner face 6 of the wall 3 of which is to be treated, receives at least a sufficient and necessary predetermined quantity of treatment substance to ensure a sufficient treatment of said container 1. When they are dealkalization treatment method and installation 2, these latter thus make it possible to obtain a pharmaceutical glass container 1 that is particularly safe from a health point of view. Moreover, by making it possible to check that all the treatment substance dispensed has been actually introduced into the container 1 to be treated, the treatment method and installation 2 advantageously allows ensuring that the glass container 1 has been suitably treated without prejudice to its mechanical strength.

It is conceivable that the operation of dispensing the treatment substance is designed to dispense the latter in continuous, that is to say in an uninterrupted manner, in a plurality of glass containers 1 moving successively facing the dispensing orifice 13 of the dispensing means 12. In this case, the check operation will advantageously be itself carried out in continuous, simultaneously to said dispensing operation. It is however preferable that the dispensing operation is carried out only when a container 1 is positioned at the dispensing means 12, and preferably facing the dispensing orifice 13 of said dispensing means 12. Therefore, the treatment substance dispensing operation is carried out in a discontinuous manner, that is to say as discrete doses (and not an uninterrupted flow) of treatment substance, only in the presence of a container 1 to be treated at the dispensing means 12, and preferably facing the dispensing orifice 13 of the latter. A costly and messy loss of treatment substance by dispersion of the latter on the conveyor 14 and on the ground is thus advantageously avoided. In this respect, provision may be made for the triggering of the dispensing means 12 to be set in order to synchronise with a known speed of movement of the containers 1 facing the dispensing orifice 13 of the dispensing means 12. The dispensing of the treatment substance will hence be triggered on the basis of a supposed presence of a container 1 facing the dispensing orifice 13 of the dispensing means 12. As an alternative, in order to allow a better accuracy of synchronization, the treatment method can advantageously comprise a detection step for detecting the actual presence of a container 1 on the conveyor 14 at the dispensing means 12, and preferably facing the dispensing orifice 13 of the latter, and to then trigger the treatment substance dispensing operation. More preferentially, the treatment method comprises a detection step for detecting the arrival upstream from the dispensing orifice 13 of the dispensing means 12 (in consideration of the direction of movement of the container 1 relative to the dispensing means 12) and to then synchronize the dispensing operation triggering with the arrival of the container 1 at the dispensing means 12, and preferably facing the dispensing orifice 13 of the latter, knowing the distance separating the container 1 from the dispensing orifice 13 at the time of detection and the speed of movement of the container 1 with respect to the dispensing means 12 or to its dispensing orifice 13. It is therefore advantageously possible to anticipate the arrival of a container 1 to be treated to further refine the accuracy of dispensing of the treatment substance.

Reciprocally, the treatment installation 2 can be designed and configured to ensure an uninterrupted operation of the dispensing means 12, in such a way that the latter can dispense the treatment substance in continuous, that is to say in an uninterrupted manner, into a plurality of glass containers 1 that move successively at the dispensing means 12, and preferably facing the dispensing orifice 13 of the latter. In this case, the treatment installation 2 will moreover be advantageously configured to ensure an uninterrupted operation of the check means 17. However, preferably, the treatment installation 2 is designed and configured to ensure that the dispensing means 12 is operated only when the container 1 is positioned at the dispensing means 12, and preferably facing the dispensing orifice 13 of the latter. In this respect, the treatment installation 2 can be configured, set, to ensure that the dispensing means 12 is operated discontinuously and synchronously with a known speed of movement of the containers 1 at the dispensing means 12, and preferably facing the dispensing orifice 13 of the latter. As an alternative, in order to allow a better accuracy of synchronization as mentioned hereinabove, the treatment installation 2 may advantageously comprise, on the one hand, a detection means configured to detect the actual presence of a container 1 on the conveyor 14 at the dispensing means 12, and preferably facing the dispensing orifice 13 of the latter, and on the other hand, a piloting unit that is connected to said detection means and to control means of the dispensing means 12 to put said dispensing means 12 in operation when the container 1 is so detected at the dispensing means 12, and preferably facing the dispensing orifice 13 of the latter. Even more advantageously, the treatment installation 2 comprises a detection means 19 configured to detect the arrival of the container 1 on the conveyor 14 upstream from the dispensing means 12, and preferably upstream from the dispensing orifice 13 of the latter. The treatment installation 2 also comprises a piloting unit 20 that is connected to said detection means 19 and to said control means of the dispensing means 12 and configured to synchronize the putting in operation of said dispensing means 12 with the arrival of the container 1 at the dispensing means 12, and preferably facing the dispensing orifice 13 of the latter. Such a synchronization may typically be obtained using a timer (not illustrated), the installation 2 will advantageously be fitted with, and in particular from the knowledge of the distance between the area of detection of the container 1 by the detection means 19 and the position of the outlet port 12, and preferably the dispensing orifice 13 of the latter, the speed of movement of the container 1 on the conveyor 14, as well as the size of the container 1.

For example, the detection means 19 is an optical barrier (or light barrier) and comprises either a light beam emitter (for example, a visible or infrared laser beam) positioned opposite a photoelectric cell, or a detection cell 21 comprising both a light beam emitter (for example, a visible or infrared laser beam) and a photoelectric cell and a light reflector 22 positioned opposite a photoelectric cell, as illustrated in FIGS. 2 and 3. The detection cell 21 and the reflector 22 are advantageously located on either side of the moving path of the container 1, at a known distance from the dispensing means 12, and preferably from the dispensing orifice 13 of the latter. The detection cell 41 emits a light beam (represented in dotted line in FIG. 3), which, in the absence of container 1, is reflected by the reflector 22 and detected by the photoelectric cell of the detection cell 41. In the presence of a container 1, the light beam is interrupted (or at least disturbed) by the container 1, in such a way that the photoelectric cell does not detect the light beam (or detects a disturbed light beam), which signs the presence of a container 1. In this case, the piloting unit 20 triggers the dispensing means 12 operation through the control means of the latter, either immediately (case of detection of the effective presence of a glass container 1 at the dispensing means 12, and preferably facing the dispensing orifice 13 of the latter), or according to a predefined timing (case of detection of the presence of a glass container 1 upstream from the dispensing means 12, and preferably facing the dispensing orifice 13 of the latter). In a particularly advantageous manner, such a detection means 19 of the optical barrier type will be designed and arranged in such a way that the light beam emitted is interrupted by the neck 10 or the ring 11 of a glass container 1, and not by the body of the latter, in order to allow a finer synchronization of the operation of the dispensing means 12, and hence a more accurate dispensing of the treatment substance into the cavity 4 of the container 1, when the latter arrives at the dispensing means 12, and preferably facing the dispensing orifice 13 of the latter. Obviously, other known and suitable detection means, not necessarily optical, may be contemplated (proximity sensors, weight sensors, etc.).

The image-capture device 16 of the treatment method and installation is typically a technical device capable of capturing at least one image, the analysis of which may be made using hardware and/or software image-processing computer means. The image-capture device 16 comprises for that purpose at least one photographic sensor, preferably of the CMOS type, designed to capture at least one image that the image-processing computer means will then be able to analyse. Said photographic sensor may be that of a camera or a video camera, or any other suitable image-capture means comprising such a photographic sensor. Advantageously, said image-capture device 16, and in particular the photographic sensor(s) the latter comprises, is designed to capture said at least one image in the visible domain, and preferably in black and white (greyscale), in order in particular to simplify the analysis thereof. The analysis of said image and the subsequent determination of the smooth running of the treatment substance dispensing by the dispensing means 12 are moreover advantageously simplified and more reliable when said image-capture device 16 is designed to capture said at least one image with the highest possible definition (or resolution), and for example an image resolution of 640×480 pixels with a pixel size of 4.8×4.8 μm.

Determining if the treatment substance is correctly dispensed by the dispensing means 12 of the treatment method and installation 2, that is to say determining whether or not at least said predetermined quantity of treatment substance and/or substantially all the dispensed treatment substance has been correctly dispensed into the cavity 4 of the container 1, may advantageously be carried out using an image-analysis software or computer algorithm, executed by a computer or any other suitable device. In particular, the recognition notably of the opening 5 of the container 1 and of the treatment substance on a captured image may be based on a software detection of colour level (and preferably, greyscale) differences between the pixels of said image. Such image-analysis software or computer algorithm, and computer or other suitable device for executing said software or algorithm, are advantageously included in the image-analysis system 18 of the check means 17 of the treatment installation 2.

Advantageously, the treatment method comprises an operation of discarding the container 1 in the case where it is determined, during the dispensing operation check, that at least the predetermined quantity of treatment substance has not been introduced into the cavity 4 of the container, through the opening 5 of the latter. Therefore, any container 1 that will have not received, during the dispensing operation, enough treatment substance to ensure the desired performance level of treatment of the inner face 6 of the wall 3 of said glass container 1 is therefore physically discarded. This container 1 will thus advantageously not be grouped with other containers 1 that would have actually received the determined quantity of necessary treatment substance. The discarded container 1 may potentially be subsequently subjected again to said dispensing operation or be scrapped for a subsequent recycling as cullet. In the case where the quantity of treatment substance dispensed during the dispensing operation is higher than said required predetermined quantity, said operation of discarding the container 1 may advantageously also concern a container 1 that, although having received said predetermined quantity into its cavity 4, has however not received all the treatment substance quantity dispensed by the dispensing means 12. Therefore, containers 1 liable to have received treatment substance on their ring 11 or on the outer face 7 of their wall 3, and hence notably liable to have for that reason mechanical and/or esthetical defects as explained hereinabove, will be advantageously discarded. Advantageously, said discarding operation is then immediately consecutive to the check operation. Preferentially carried out automatically, the discarding operation can be carried out in a simple way using a means 23 for discarding the container 1 comprising, for example, a movable cleat or a pusher, which intercepts the container 1 downstream from the dispensing means 12 and sets it aside from the flow of containers 1 moving on the conveyor 14 after treatment substance dispensing. Obviously, other suitable discarding means may be contemplated (gripper arm, trapdoor, etc.) to carry out such an operation. As an alternative, it may be contemplated that the treatment method does not comprise such an operation of discarding the container 1, but comprises for example generating a computer alert, sound or light, to draw attention of a production operator to the presence of a container 1 determined as being non-compliant. This being said, the operation of discarding the container 1 contemplated hereinabove is preferably insofar as it limits or cancels the necessity for a human intervention.

Reciprocally, in order to advantageously implement the above-mentioned discarding operation, the treatment installation 2 preferentially comprises a device 23 for discarding the container 1, which is connected to the image-analysis system 18 of the check means 17 and that is configured to discard said container 1 when the image-analysis system 18 determines that at least said predetermined quantity of treatment substance has not been introduced into the accommodation cavity 4 of the container 1 through the opening 5 of the latter. As illustrated in the examples of FIGS. 2 and 3, Ie discarding device 23, the operation of which is preferably automated, comprises for example a mobile cleat or a pusher, which is arranged in such a way as to be able to intercept the container 1 downstream from the dispensing means 12 and to set it aside from the flow of containers 1 moving on the conveyor 14 after treatment substance dispensing. The installation 2 can moreover comprise an evacuation conveyor or hooper (not illustrated) to receive and evacuate the so-discarded container 1.

According to an embodiment of the treatment method, a single image of said spatial area including the opening 5 of the container 1 is captured by said image-capture device 16 during the dispensing operation. Advantageously, said image is then captured at the time when the treatment substance dispensed by the dispensing means 12 arrives at a plane of said spatial area, which is predefined as corresponding to a plane in which is inscribed the opening 5 of the container 1 to be treated when the latter arrives at the dispensing means 12, and preferably facing the dispensing opening 13 of the latter. For that purpose, the image-capture device triggering may be synchronized, for example, using an optical barrier whose light beam is located in said predefined plane. Therefore, when the treatment substance arrives at the predefined plane, it interrupts the light beam of the optical beam, which triggers the capture of the image. The determination of the dispensing operation smooth run can then advantageously be carried out according to the following principle.

If, on the captured image, a point of intersection between the treatment substance and the predefined plane (in which is then inscribed the opening 5 of the container 1 to be treated) is located upstream or downstream from the opening 5 of the container 1, it is then deduced that the container 1 is late or early with respect to the treatment substance, and that the latter will therefore be dispensed at least in part on the outer face 7 and the wall 3 and/or on the ring 11 of the container 1, and that the treatment substance will thus no be fully dispensed into the accommodation cavity 4 of the container 1. However, according to the position of this intersection point with respect to the opening 5 of the container 1 on the captured image, and knowing advantageously the time required for at least said predetermined quantity of dispensed treatment substance travels the distance d that separates the dispensing orifice 13 of the dispensing means 12 from the opening 5 of the container 1, the characteristics (orientation, direction, speed, etc.) of the moving path of the container 1 with respect to the dispensing means 12, as well as the size (diameter) of the opening 5 of the container 1, it is then possible to determine whether or not at least said predetermined quantity of dispensed treatment substance will nevertheless have the time to go through the opening 5 of the container 1 to reach the accommodation cavity 4 of the latter.

If said intersection point between the treatment substance and the predefined plane is located at the opening 5 of the container 1, it is deduced therefrom that at least part of the quantity of dispensed treatment substance will be actually dispensed into the accommodation cavity 4 of the container 1. According to the position of this intersection point with respect to the opening 5 of the container 1 on the captured image, and knowing advantageously the time required in for at least said predetermined quantity, and preferably all the quantity, of dispensed treatment substance travels the distance d that separates the dispensing orifice 13 of the dispensing means 12 from the opening 5 of the container 1, the characteristics (orientation, direction, speed, etc.) of the moving path of the container 1 with respect to the dispensing means 12, as well as the size of the opening 5 of the container 1, it is then possible to determine whether or not said predetermined quantity and/or all the quantity of dispensed treatment substance will have the time to go through the opening 5 of the container 1 to reach the accommodation cavity 4 of the latter.

Symmetrically, the image-capture device 16 of the check means 17 of the treatment installation 2 can thus by designed, configured, set, to capture a single image of such a spatial area including the opening 5 of the container 1 when the dispensing means 12 is in operation and dispenses said treatment substance. The image-analysis system 18 of said check means 17 is then advantageously designed, configured, set, to determine, by analysing the captured image and advantageously according to the above-described principle, whether or not at least said predetermined quantity and/or all the quantity of dispensed treatment substance has been introduced into the cavity 4 of the container 1 through the opening 5 of the latter.

However, determining a compliant dispensing of the treatment substance from the capture and analysis of a single image may turn out to be relatively complex to implement, in particular as regards the accuracy of triggering of the image capture and the analysis of the latter based on a high number of parameters. Moreover, there exists a risk that the single image, although being captured at the right time, has not a sufficient quality (blurred, insufficient exposure, etc.) to allow, by analysis, a reliable and repeatable determination of the smooth running of the treatment substance dispensing operation.

That is why, according to another embodiment, it preferentially captured, using said image-capture device 16, a plurality of images (typically between 2 and 10 images, for example 6 images) of said spatial area including the opening 5 of the container 1, preferably during at least the whole duration of said dispensing operation. To advantageously implement such a preferential embodiment of the treatment method, the image-capture device 16 of the installation 2 is then preferentially configured to capture such a plurality of images of said spatial area including the opening 5 of the container 1, advantageously during at least the whole duration of dispensing of the treatment substance by the dispensing means 12 of said installation 2. In this case, the image-capture device 16 of the treatment method and installation 2 advantageously comprises a technical means capable of capturing images in a substantially continuous manner, such as in particular at least one video camera provided with the above-mentioned photographic sensor. Determining the compliance/non-compliance of the treatment substance dispensing into the cavity 4 of the container 1 to be treated will hence advantageously be based on the analysis of several images, captured successively while the treatment substance is dispensed by the dispensing means 12 towards the container 1. Advantageously, said plurality of captured images will include at least one image that will have been captured at the time when the treatment substance dispensed by the dispensing means 12 arrives at a plane of said spatial area, which is predefined as corresponding to a plane in which is inscribed the opening 5 of the container 1 to be treated when the latter arrives facing the dispensing means 12, as explained hereinabove. According to the number of images captured by the image-capture device 16, it will be advantageously possible, by analysis of these images, to follow with a more or less fine time step the progress of the treatment substance dispensing operation. Determining the compliance/non-compliance of the treatment substance dispensing is therefore easier and more reliable.

As in the embodiment in which a single image is captured, determining the correct introduction of the treatment substance into the cavity 4 of the container 1, based on a plurality of captured images, may advantageously be carried out in particular based on the knowledge of the size (diameter) of the opening 5 of the container 1 (the diameter of the opening 5 of the ring 11 of the containers 1 to be treated being in practice systematically measured, checked, in line) and on the characteristics (orientation, direction, speed, etc.) of the moving path of the container 1 with respect to the dispensing means 12. It is possible to rely on the capture of at least two distinct images, one being captured at the time when the treatment substance dispensed by the dispensing means 12 arrives at a predefined plane of said spatial area, which is positioned at known fixed distances from the dispensing means 12 and from the plane in which is inscribed the opening 5 of the container 1 to be treated when the latter arrives facing the dispensing means 12, the other being captured at the time when the treatment substance finishes passing through said predefined plane. Determining the correct introduction of the treatment substance may then implement a calculation of the time separating the respective captures of these two images, and/or a calculation of the time separating the triggering of the treatment substance dispensing operation and the capture of the first of said images, and/or a calculation of the time separating the triggering of the treatment substance dispensing operation and the capture of the second of said images.

Obviously, other principles of image analysis and subsequence determination, from such an analysis, of whether or not at least said predetermined quantity and/or substantially all the quantity of the treatment substance dispensed by the dispensing means 12 has been introduced into the cavity 4 of the container 1 through the opening 5 of the latter, may be implemented without thereby departing from the framework of the invention.

In this preferential embodiment implementing the capture of a plurality of images, the check operation of the treatment method, and in particular the capture of images by the image-capture device 16, is preferably triggered only when the container 1 to be treated is positioned at the dispensing means 12, and preferably facing the dispensing orifice 13 of the latter. In other words, the image-capture device 16 advantageously captures no image in the absence of container 1 to be treated at the dispensing means 12, and preferably facing the dispensing orifice 13 of the latter. The implementation of said check operation is therefore simplified, insofar that the quantity of images to be analysed is limited. Even more preferentially, the treatment substance dispensing operation is carried out only when the container 1 is positioned at the dispensing means 12, and preferably facing the dispensing orifice 13 of the latter, as contemplated hereinabove, and the check operation triggering is then synchronized with the triggering of said dispensing operation. As an alternative, the substance dispensing operation could on the contrary be carried out in a substantially uninterrupted manner, that is to say in the presence or not of a container 1 at the dispensing means 12. However, it would remain advantageous that the check operation is carried out, triggered, only when the container 1 is positioned at the dispensing means 12, and preferably facing the dispensing orifice 13 of the latter.

Symmetrically, as regards the treatment installation 2, the latter is then preferably designed and configured to ensure that the check means 17, and in particular the image-capture device 16 of the latter, is operated only when the container 1 to be treated is located at the dispensing means 12, and preferably facing the dispensing orifice 13 of the latter. Even more preferentially, the treatment installation 2 is designed and configured to ensure that the dispensing means 12 is operated only when the container 1 is positioned at the dispensing means 12, and preferably facing the dispensing orifice 13 of the latter, as contemplated hereinabove, and to further ensure that the check means 17 is operated synchronously with the putting in operation of the dispensing means 12. As an alternative, the treatment installation 2 could on the contrary be designed and configured so that the dispensing means 12 dispenses said treatment substance in a substantially uninterrupted manner, that is to say in the presence or not of a container 1 at the dispensing means 12. However, it would remain advantageous that said treatment installation 2 is designed and configured to ensure that the check means 17, and in particular the image-capture device 16 of the latter, is operated only when the container 1 to be treated is positioned at the dispensing means 12, and preferably facing the dispensing orifice 13 of the latter.

Advantageously, the analysis of the captured image(s) is carried out in real time, or at least immediately following the capture thereof, in order to allow the fastest determination possible of compliance or not of the treatment substance dispensing and the triggering, as the case may be, of an operation of discarding, as described hereinabove, a container 1 that would not have received in its cavity 4 the expected treatment substance quantity.

The image-capture device 16 of the treatment method and installation is preferentially chosen able to capture one or several images with a time resolution of at least 50 images per second (or fps), preferably at least 100 images per second, preferably at least 500 images per second, more preferably at least 800 images per second. Typically, the photographic sensor of the image-capture device 16 can then be that of a so-called "high speed" or "low motion" video camera. It is therefore advantageously possible to check accurately and efficiently the correct dispensing of the treatment substance at very high speeds of movement of the container 1 with respect to the dispensing means 12, and that for containers 1 of any shape and size, including containers with very small ring opening and/or for very high treatment substance dispensing speeds. Therefore, the treatment method and installation 2 particularly suit to an industrial context of glass container manufacture and treatment. For example, for a time resolution of about 900 images per second, it is advantageously possible to check in an efficient and reliable manner the dispensing of the treatment substance in a glass container 1 of the vial type, the opening 5 of the ring 11 of which has a diameter of 12 mm, said container 1 being in motion relative to the dispensing means 12 along a rectilinear path T, at a speed of about 40 metres per minute (which defines a time window of at most about 18 ms for the efficient dispensing of the treatment substance into the cavity 4 of the container 1).

As illustrated in particular in FIGS. 2 and 3, the image-capture device 16 further preferentially comprises an intense light source 24 (preferably white), advantageously placed in such a way that the container 1 is positioned between the photographic sensor(s) and the light source 24, in order to optimize the operation of the photographic sensor(s) and the quality of the captured images, in particular at high treatment rates and for a high time resolution of the photographic sensor(s).

Preferentially, the glass constituting the wall 3 of the container 1 is transparent in a domain of vision of the image-capture device 16. When said domain of vision corresponds to the visible domain, it can hence be a colourless glass (white glass) or a coloured glass (yellow or amber glass, for example). In this case, said check operation can advantageously comprise capturing, by said image-capture device 16, during said dispensing operation, at least one image (and preferably a plurality of images) of a spatial area including, by transparency, at least a portion of the accommodation cavity 4 of the container 1, and preferably the whole accommodation cavity 4 of the container 1. The check operation may comprise determining, by analysing the so-captured image(s), a consequence of the introduction of the treatment substance into the accommodation cavity 4 of the container 1. Symmetrically, the image-capture device 12 of the treatment installation 2 may be advantageously configured to capture at least one image of such a spatial area including at least a portion of the accommodation cavity 4 of the container 1, and preferably the whole accommodation cavity 4 of the container 1, when the dispensing means 12 of the installation 2 is in operation and dispenses said treatment substance. The image-analysis system 18 of the check means 17 may then be advantageously configured to determine, by analysing the so-captured image, a consequence of the introduction of the treatment substance into the accommodation cavity 4 of the container 1.

That way, it is in particular possible to characterize at least in part a behaviour of the treatment substance when the latter reaches the cavity 4 of the container 1, such as for example a path followed by the treatment substance through the cavity 4 or a distribution of said treatment substance at the surface of the inner face 6 of the wall 3 of the container 1. It is also potentially possible to characterize a visible change in the appearance of all or part of the inner face 6 of the wall 3 in reaction to the introduction of the treatment substance (opacification of the wall 3, etc.). In the case where the treatment substance would be intended to allow an immediate treatment of the inner face 6 of the wall 3 of the container 1, that is to say as soon as at least part of said treatment substance has been introduced into the cavity 4 of the container 1, the analysis of the so-captured image can then advantageously determine the existence or not of a visible phenomenon associated with said treatment, and potentially to quantify the intensity thereof. For example, in the case described hereinabove, in which the treatment substance is designed to allow a dealkalization treatment of the glass of the inner face 6 of the wall 3 of the container 1 by reaction of the treatment substance under the heat of said inner face 6, brought to a suitable treatment temperature, when the last treatment substance is dispensed into a container 1, the check operation may then advantageously comprise determining the presence or not within the cavity 4 of the container 1 of fumes characteristic of the hot reaction of the treatment substance. Therefore, said check operation thus advantageously allows checking not only the smooth running of the treatment substance dispensing operation, but also, in certain cases, and at least partially, the smooth running of the treatment of the inner face 6 of the wall 3 of the container 1 by said treatment substance. For example, by determining by image analysis an absence or insufficiency of characteristic fumes inside the cavity 4 of the container 1, whereas it is determined that the desired quantity (predetermined or total) of treatment substance has actually been dispensed into said cavity 4, the check operation advantageously allow identifying that the temperature of the inner face 6 of the wall 3 of the container 1 was not sufficient to allow a good reaction of the treatment substance and hence a sufficient treatment of the container 1. The latter can then be considered as non-compliant and be discarded.

As an alternative, or preferably as a complement, the check operation may advantageously comprise
  capturing, by said image-capture device 16, during said dispensing operation, at least one image (and preferably capturing successively a plurality of images) of a spatial area in which is included the treatment substance when the latter is dispensed by the dispensing means 12, and
  determining, by analysing said at least one so-captured image, the value of a parameter of the dispensing operation chosen in particular among a volume of the dispensed treatment substance, a mass of the dispensed treatment substance, an apex angle value $\theta$ of a treatment substance dispensing cone C, and a combination of all or part of these parameters.

Reciprocally, as an alternative or preferably as a complement, the image-capture device 16 of the treatment installation 2 is advantageously configured to capture at least one image (and preferably to capture successively a plurality of images) of a spatial area in which is included the treatment substance when the latter is dispensed by the dispensing means 12. The image-analysis system 18 of the treatment installation 2 is then advantageously configured to determine, by analysing said at least one so-captured image, the value of an operating parameter of the dispensing means 12, chosen in particular among a volume of the dispensed treatment substance, a mass of the dispensed treatment substance, an apex angle value $\theta$ of a treatment substance dispensing cone C, and a combination of all or part of these parameters.

Advantageously, at least the dispensing orifice 13 of the dispensing means 12 and the opening 5 of the container 1 are then included in said spatial area, and hence in the so-captured image(s). The analysis of the so-captured image(s) and subsequent determination of said parameters will be typically carried out using an image-analysis software or algorithm designed and configured to detect, measure and extrapolate if need be the shape and sizes of a dose formed of all or part of the quantity of treatment substance dispensed by the dispensing means 12 and visible in the images captured by the image-capture means 16. Obviously, other parameters than those mentioned hereinabove can also be advantageously determined.

Thus, optical check of the treatment substance dispensing may advantageously allow a real-time warning of any potential variation over time in the value of at least one of the above-mentioned parameters of treatment substance dispensing. Such an optical control may therefore provide real time feedback on the operation of the dispensing means 12, in such a way as to ensure a perfect stability, repeatability, of the operation of the latter over time. For example, if a certain deviation over time of the quantity of treatment substance really dispensed by the dispensing means 12 with respect to a quantity of treatment substance defined as a set point is determined, it will be advantageously possible to immediately control in return a change of operation of the dispensing means 12 in order to correct said deviation. The reliability of the treatment method and installation 2 will thus be improved, and the assurance of obtaining a sufficiently treated glass container will be further strengthened.

As already mentioned hereinabove, the image-capture device 16 can possibly comprise a plurality of photographic sensors, in particular in the case where, during the check operation, it is desired to capture at least one image of the spatial area including the opening 5 of the container 1 and at least one image of a spatial area including at least a portion of the accommodation cavity 4 of the container 1, and preferably the totality of the accommodation cavity 4 of the container 1. In this case, the photographic sensors can be positioned at different places with respect to the dispensing means 12 and the container 1 to be treated, in such a way as to optimize the image capture. In the case where, during the treatment substance dispensing check operation, a plurality of images is captured, the photographic sensors may each belong to a separate video camera (or any other suitable technical means). The corresponding spatial areas may then be either two-dimensional or three-dimensional. However, preferentially, said image-capture device 16 of the treatment method and installation comprises a single photographic sensor. The latter is thus positioned in such a way as to be able to capture at least one image of a spatial area including the opening 5 of the container 1, and advantageously in such a way as to also capture, preferably simultaneously, an image of a spatial area including at least a portion, and more preferably the totality, of the accommodation cavity 4 of the container 1. In this case, the corresponding spatial area(s) are hence essentially two-dimensional. The design, setting and implementation of the check operation/check means 17 is therefore advantageously simplified and more reliable, and the cost is better controlled. Moreover, the check means 17 of the treatment installation 2 is therefore more compact, and may be easily integrated in the immediate proximity of the dispensing means 12.

It is to be noted that the treatment method and installation 2 according to the invention, which thus implement an optical check operation, are therefore suit particularly to the cases in which it is not conceivable to control by mechanical means a quantity of treatment substance introduced into the cavity 4 of a container 1, as for example using a force sensor that would be placed under the bottom 8 of the container, to measure a mass variation of the latter during the dispensing operation, and that, in particular, due to a too small mass of treatment substance dispensed, to a too high speed of movement of containers 1 during the dispensing operation, to a too high temperature of the container 1 to be treated and/or also to an instantaneous reaction of the treatment substance as soon as the latter enters said cavity 4 (as may be the case with a dealkalization substance).

Moreover, it is understood that such an optical check of the treatment substance dispensing could advantageously allow verifying and correcting, if need be, at the beginning of the campaign of treatment of glass containers 1, the spatial arrangement of the dispensing means 12 with respect to the flow of containers 1 circulating on the conveyor 14, and in particular with respect to the opening 5 of these latter, and the setting of the quantity of treatment substance the dispensing means 12 must dispense.

As explained hereinabove, the invention is obviously not limited to such a dealkalization treatment. Indeed, the treatment installation and method could also be treatment installation and method for doping, chemically hardening, etc., the inner face 6 of the wall 3 of the glass container 1, according in particular to the nature of the treatment substance used, and that particularly when the aim is to ensure in a simple and efficient manner that the container 1, the inner face 6 of the wall 3 of which is to be treated, receives at least a predetermined sufficient and necessary quantity of treatment substance to ensure a sufficient treatment of said container 1.

POSSIBILITY OF INDUSTRIAL APPLICATION

The invention finds its industrial application in the design, making and implementation of installations and methods for treating the inner face of the wall of glass containers, and in particular pharmaceutical and diagnostic containers.

The invention claimed is:

1. A method for treating the inner face (6) of the wall (3) of a glass container (1), which wall (3) delimits an accommodation cavity (4) for a product and an opening (5) providing access to said accommodation cavity (4), said method comprising:
   an operation of dispensing a treatment substance into said cavity (4), using a dispensing means (12) an orifice (13) of which for dispensing said treatment substance is located at a distance from the opening (5) of the container (1) and outside the latter, said container (1) being in motion relative to said dispensing means (12), and
   a check operation comprising capturing, by an image-capture device (16), during said dispensing operation, at least one image of a spatial area including the opening (5) of the container (1), and determining, by analysing the so-captured image, whether or not at least a predetermined quantity of said treatment substance has been introduced into the cavity (4) of the container (1) through the opening (5) of the latter.

2. The method according to claim 1, wherein the check operation comprises determining, by analysing the so-captured image, whether or not substantially all the quantity of treatment substance dispensed by the dispensing means (12) during said dispensing operation has been introduced into the cavity (4) of the container (1), through the opening (5) of the latter.

3. The method according to claim 1, wherein said image-capture device (16) is able to capture one or several images with a time resolution of at least 50 images per second, preferably at least 100 images per second, preferably at least 500 images per second, more preferably at least 800 images per second.

4. The method according to claim 1, wherein a plurality of images of said spatial area including the opening (5) of the container (1) is captured using said image-capture device (16), during at least the whole duration of said dispensing operation.

5. The method according to claim 4, characterized in that said dispensing operation is carried out only when the container (1) is positioned at the dispensing means (12), and preferably facing the dispensing orifice (13) of said dispensing means (12), the check operation triggering being synchronized with the dispensing operation triggering.

6. The method according to claim 1, which is a method for dealkalization treatment of the glass in the vicinity of the surface of the inner face (6) of the wall (3) of the container (1).

7. The method according to claim 6, wherein said operation of dispensing the treatment substance into the accommodation cavity (4) of the container (1) is carried out while the inner face (6) of the wall (3) of said container (1) is at a temperature of at least 350° C., preferably between 350° C. and 700° C., said treatment substance being designed to react under the heat of the inner face (6) of the wall (3) of the container (1) to cause a dealkalization of the glass.

8. The method according to claim 1, which comprises an operation of discarding the container (1) in the case where it is determined, during said check operation, that at least said predetermined quantity of treatment substance has not been introduced into the cavity (4) of said container (1).

9. The method according to claim 1, wherein the glass of the container (1) is transparent in a domain of vision of the image-capture device (16), said check operation comprising capturing, by said image-capture device (16), during said dispensing operation, at least one image of a spatial area including at least a portion of the accommodation cavity (4) of the container (1), and preferably the totality of the accommodation cavity (4) of the container (1), and determining, by analysing the so-captured image, a consequence of the introduction of the treatment substance into the accommodation cavity (4) of the container (1).

10. The method according to claim 1, wherein said check operation comprises capturing, by said image-capture device (16), during said dispensing operation, at least one image of a spatial area in which is included the treatment substance when the latter is dispensed by the dispensing means (12), and determining, by analysing the so-captured image, the value of a parameter of the dispensing operation chosen among a volume of the dispensed treatment substance, a mass of the dispensed treatment substance, an apex angle value θ of a treatment substance dispensing cone (C), and a combination of all or part of these parameters.

11. The method according to claim 1, wherein said image-capture device (16) comprises a single photographic sensor.

12. An installation (2) for treating the inner face (6) of the wall (3) of a glass container (1), which wall (3) delimits an accommodation cavity (4) for a product and an opening (5) providing access to said accommodation cavity (4), said installation (2) comprising:

a dispensing means (12) for dispensing a treatment substance into said cavity (4), said dispensing means (12) being provided with an orifice (13) for dispensing said treatment substance and being designed so that said dispensing orifice (13) is located at a distance from the opening (5) of the container (1) and outside the latter and to dispense said treatment substance while said container (1) is in motion relative to said dispensing means (12), and a check means (17) comprising an image-capture device (16) for capturing, when the dispensing means (12) dispenses said treatment substance, at least one image of a spatial area including the opening (5) of the container (1), and an image-analysis system (18) for determining, by analysing the captured image, whether or not at least a predetermined quantity of said treatment substance has been introduced into the cavity (4) of the container (1) through the opening (5) of the latter.

13. The installation (2) according to claim 12, wherein said image-analysis system (18) is configured to determine, by analysing the captured image, whether or not substantially all the quantity of treatment substance dispensed by the dispensing means (12) has been introduced into the cavity (4) of the container (1), through the opening (5) of the latter.

14. The installation (2) according to claim 2, wherein said image-capture device (16) is able to capture one or several images with a time resolution of at least 50 images per second, preferably at least 100 images per second, preferably at least 500 images per second, more preferably at least 800 images per second.

15. The installation (2) according to claim 12, wherein said image-capture device (16) is configured to capture a plurality of images of said spatial area including the opening (5) of the container (1), during at least the whole duration of dispensing of the treatment substance by the dispensing means (12).

16. The installation (2) according to claim 15, wherein said installation (2) is designed and configured to ensure that the dispensing means (12) is operated only when the container (1) is positioned at the dispensing means (12), and preferably facing the dispensing orifice (13) of the latter, said installation (2) being further designed and configured to ensure that the check means (17) is operated synchronously with the putting in operation of the dispensing means (12).

17. The installation (2) according to claim 12, wherein said installation (2) is an installation (2) for dealkalization treatment of the glass in the vicinity of the surface of the inner face (6) of the wall (3) of the container (1).

18. The installation (2) according to claim 17, which is designed to dispense said treatment substance while the inner face (6) of the wall (3) of said glass container (1) is at a temperature of at least 350° C., and preferably between 350° C. and 700° C., said treatment substance being designed to react under the heat of the inner face (6) of the wall (3) of the container (1) to cause a dealkalization of the glass.

19. The installation (2) according to claim 12, which comprises a device (23) for discarding said container (1), which is connected to said image-analysis system (18) and configured to discard said container (1) when the image-analysis system (18) determines that at least said predetermined quantity of treatment substance has not been introduced into the accommodation cavity (4) of the container (1).

20. The installation (2) according to claim 12, wherein said image-capture device (16) is configured to capture at least one image of a spatial area including at least a portion of the accommodation cavity (4) of the container (1), and preferably of the totality of the accommodation cavity (4) of the container (1), when the dispensing means (12) dispenses said treatment substance, and wherein said image-analysis system (18) is configured to determine, by analysing the captured image, a consequence of the introduction of the treatment substance into the accommodation cavity (4) of the container (1).

21. The installation (2) according to claim 12, wherein said image-capture device (16) is configured to capture at least one image of a spatial area in which is included the treatment substance when the latter is dispensed by the dispensing means (12), and wherein said image-analysis system (18) is configured to determine, by analysis of the so-captured image, the value of a parameter of the dispensing means (12) operation chosen among a volume of the dispensed treatment substance, a mass of the dispensed treatment substance, an apex angle value ($\theta$) of a treatment substance dispensing cone (C), and a combination of all or part of these parameters.

22. The installation (2) according to any claim 12, wherein said image-capture device (16) comprises a single photographic sensor.

* * * * *

UNITED STATES PATENT AND TRADEMARK OFFICE
CERTIFICATE OF CORRECTION

PATENT NO. : 12,275,669 B2
APPLICATION NO. : 17/791481
DATED : April 15, 2025
INVENTOR(S) : Pierre-Luc Etchepare, Christophe Depoilly and Jingwei Zhang

Page 1 of 1

It is certified that error appears in the above-identified patent and that said Letters Patent is hereby corrected as shown below:

In the Claims

Claim 14, Column 23, Line 29, please remove the phrase "according to claim 2" and replace with "according to claim 12".

Signed and Sealed this
Twenty-seventh Day of May, 2025

Coke Morgan Stewart
*Acting Director of the United States Patent and Trademark Office*